United States Patent
Jansen et al.

(10) Patent No.: US 11,359,673 B2
(45) Date of Patent: Jun. 14, 2022

(54) PACKAGE OF LAMINATIONS, MANUFACTURING METHOD, MULTI-PLATE COUPLING AND INDUSTRIAL APPLICATION

(71) Applicant: Flender GmbH, Bocholt (DE)

(72) Inventors: Andre Jansen, Borken (DE); Stefan Kleinewegen, Bocholt (DE); Marcel Reidl, Vreden (DE); Günter Scheithauer, Vreden (DE)

(73) Assignee: FLENDER GMBH, Bocholt (DE)

( * ) Notice: Subject to any disclaimer, the term of this patent is extended or adjusted under 35 U.S.C. 154(b) by 108 days.

(21) Appl. No.: 16/838,765

(22) Filed: Apr. 2, 2020

(65) Prior Publication Data

US 2020/0318688 A1    Oct. 8, 2020

(30) Foreign Application Priority Data

Apr. 3, 2019 (EP) .................................... 19166941

(51) Int. Cl.
  *F16D 3/62* (2006.01)
  *F16D 1/033* (2006.01)
(52) U.S. Cl.
  CPC ............... *F16D 1/033* (2013.01); *F16D 3/62* (2013.01); *Y10T 29/49789* (2015.01)
(58) Field of Classification Search
  CPC ... F16D 1/033; F16D 3/79; F16D 3/78; F16D 13/52; F16D 13/683; F16D 3/62; Y10T 29/49789; B21D 22/02
  USPC ...................................................... 464/69, 94
  See application file for complete search history.

(56) References Cited

U.S. PATENT DOCUMENTS

| 1,781,409 A | * | 11/1930 | Rayfield | ................... F16D 3/62 464/69 |
| 2,630,692 A | * | 3/1953 | Naugler | ................... F16D 3/50 464/69 |
| 4,449,621 A |   | 5/1984 | F'Geppert | |
| 4,661,084 A | * | 4/1987 | Federn | ...................... F16D 3/60 464/69 |
| 5,566,803 A | * | 10/1996 | Lindner | ................... F16D 13/64 |

(Continued)

FOREIGN PATENT DOCUMENTS

| CN | 101356384 A | 1/2009 |
| CN | 201236899 Y | 5/2009 |
| CN | 202100622 U | 1/2012 |

(Continued)

OTHER PUBLICATIONS

Chinese Search Report dated Feb. 9, 2022 with respect to counterpart Chinese patent application 2020102560376.

(Continued)

*Primary Examiner* — Greg Binda
(74) *Attorney, Agent, or Firm* — Henry M. Feierisen LLC (57) ABSTRACT

A package of laminations includes a plurality of lamella segments, which are arranged in layers and embodied to be connected together as ring segments. Each of the lamella segments has a plurality of cutouts and at least one of the lamella segments has at least three cutouts. The lamella segments are interconnected via sleeves. A method for manufacturing a package of laminations, a multi-plate coupling employing the package of laminations and an industrial application using the package of laminations are also described.

11 Claims, 7 Drawing Sheets

(56) References Cited

U.S. PATENT DOCUMENTS 5,944,611 A    8/1999   McCullough

FOREIGN PATENT DOCUMENTS

| CN | 108691909 A | 10/2018 |
|---|---|---|
| DE | 3218521 A1 | 11/1983 |
| DE | 102010053691 A1 | 6/2012 |
| EP | 0190571 A2 | 8/1986 |
| EP | 0702164 A1 | 3/1996 |
| EP | 2565481 A1 | 3/2013 |
| JP | H0396718 A | 4/1991 |
| WO | WO 2014203671 A1 | 12/2014 |

OTHER PUBLICATIONS

Translation of Chinese Search Report dated Feb. 9, 2022 with respect to counterpart Chinese patent application 202102560376.

\* cited by examiner

PACKAGE OF LAMINATIONS, MANUFACTURING METHOD, MULTI-PLATE COUPLING AND INDUSTRIAL APPLICATION

CROSS-REFERENCES TO RELATED APPLICATIONS

This application claims the priority of European Patent Application, EP 19166941.5, filed on Apr. 3, 2019, pursuant to 35 U.S.C. 119(a)-(d), the content of which is incorporated herein by reference in its entirety as if fully set forth herein.

BACKGROUND OF THE INVENTION

The present invention relates to a package of laminations, which is suitable for use in a multi-plate coupling. The invention also relates to a manufacturing method for a corresponding package of laminations. The invention relates equally to a multi-plate coupling, which uses an inventive package of laminations and to an industrial application, which is equipped with such a multi-plate coupling.

The following discussion of related art is provided to assist the reader in understanding the advantages of the invention, and is not to be construed as an admission that this related art is prior art to this invention.

In a plurality of technical applications, in which multi-plate couplings are employed, there is a demand for multi-plate couplings with a high mechanical performance capability, in particular for a high rated torque in operation. At the same time the requirement exists for a space-saving design of powerful multi-plate couplings. A high level of reliability, a long life and simple, fast and economic manufacturing is demanded for such multi-plate couplings.

It would therefore be desirable and advantageous to obviate prior art shortcomings and to provide an improved multi-plate coupling that offers an improvement in at least one of the aspects outlined.

SUMMARY OF THE INVENTION

According to one aspect of the present invention, a package of laminations has a plurality of lamella segments arranged in layers, which are essentially combined into the package of laminations. The lamella segments are embodied as ring segments and are suitable, in the assembled state, for embodying a circumferential closed outer contour, such as for example in a ring lamella. The lamella segments each have a plurality of cutouts, which in the assembled state are arranged flush with one another. The cutouts are each embodied to accommodate a sleeve. The layered arrangement of the lamella segments and the flush arrangement of the cutouts of different lamella segments means that a sleeve extends in the inventive package of laminations through the lamella segments lying on top of one another, i.e. layered. By accommodating at least one sleeve, lamella segments are connected to one another. The lamella segments are thus embodied, during operation of a multi-plate coupling, to accept the torque introduced in the form of tensile stress. In accordance with the invention at least one lamella segment in the package of laminations has at least three cutouts, which are each embodied to accept a sleeve. This allows two adjacent packages of laminations to be connected to one another via a choice of a number of sleeves. As a result of this a greater degree of constructional freedom exists for combining a number of lamella segments as ring segments into a circumferential closed outer contour, i.e. a package of laminations. In particular a compact arrangement of lamella segments can be achieved in this way, which at the same time provides a high degree of ability to withstand mechanical stress.

According to one embodiment of the present invention, the package of laminations may have a first and a second lamella segment, which are arranged adjacent to one another. The first and second package of laminations are arranged partly overlapping and are connected to one another via a sleeve in each case at at least two cutouts. A form fit is established between the first and second lamella segment by the sleeve. The partly overlapping arrangement of the first and second lamella segment enables these to be connected to further lamella segments. Thus, the lamella segments serving as ring segments can be connected to one another into a closed circumferential outer contour. As a consequence, the package of laminations can be put together, i.e. manufactured, in a simple manner from lamella segments and sleeves.

The first lamella segment may project beyond the second lamella segment in a circumferential direction of the package of laminations. In this case, the first lamella segment projects beyond the second lamella segment at least to the extent that at least one cutout, in particular at an overlapping end of the first lamella segment, is not flush with any cutout of the second lamella segment. The at least one cutout of the first lamella segment projecting beyond the second lamella segment can thus be connected to further lamella segments of the package of laminations. This also enables a choice to be made of the number of sleeves with which the first and second package of laminations are connected to one another. Equally a further connection with further packages of laminations can thus be predetermined. As a result, the lamella segments can be connected to one another partly overlapping. An assembly of lamella segments manufactured in this way offers a high degree of ability to withstand mechanical stress with reduced dimensions. The ability to withstand mechanical stress in this case includes an increased nominal torque with which a multi-plate coupling that has a corresponding package of laminations can be operated under normal operating conditions. The claimed package of laminations has a reduced thickness with the same rigidity of the bolt connection compared to a package of laminations constructed with stacks of lamellae.

The package of laminations can further have a total of six, eight, ten or twelve sleeves. Accordingly the package of laminations is connected with three, four, five or six fastening means to a first and second flange of a multi-plate coupling. The higher the number of fastening means that can be accommodated in the package of laminations, the higher is the torque able to be transmitted and the lower is the misalignment capability of the package of laminations. The claimed package of laminations is consequently scalable in a simple manner and therefore suitable for a broad spectrum of areas of application.

According to another embodiment of the present invention, the package of laminations, when viewed in a radial direction, may have a curved section arranged between two adjacent sleeves. Therefore, in a layer of the package of laminations a load-bearing section of a lamella segment or an empty space lies between two sleeves. An empty space is present if, in the corresponding layer both sleeves are accommodated in cutouts at the ends of different lamella segments. A degree of lamella filling of the package of laminations is thus produced in relation to the overall package of laminations. The degree of lamella filling is a quotient and is based in the numerator on the number of load-bearing sections present in the overall package of laminations. The degree of lamella filling is further based in the denominator on the number of load-bearings sections theoretically present, if the lamella segments were to be replaced by one-piece ring lamella. This corresponds to the number of sleeves in the package of laminations multiplied by the number of layers in the package of laminations. According to a form of embodiment of the claimed package of laminations, this has a degree of lamella filling of at least 60%. The higher the degree of lamella filling is, the more similar mechanically the claimed package of laminations is to a package of laminations with the same dimensions that is composed of one-piece ring lamellae. By contrast with the claimed solution a package of laminations with a layered lamella construction only has a degree of lamella filling of at most 50%. The claimed solution allows packages of laminations to be produced that approach those comprising one-piece ring lamellae in their mechanical characteristics, but can be manufactured cost-effectively from easy-to-manufacture lamella segments. The claimed package of laminations in this case offers a high level of cost benefits.

At least one sleeve, which has a cross section that deviates from a circular shape, can further be accommodated in the package of laminations. Accordingly, the cutouts in the lamella segments also have a shape that deviates from a circular shape and essentially corresponds to the cross section of the sleeve. Through this a form fit is established between the sleeve and the lamella segments. The form fit between the lamella segments and the sleeve prevents the sleeve from turning during operation, which can increase wear on the lamella segments. Moreover, the collar of the sleeve can have at least one straight section, which serves as a bent edge. Through this the distribution of stress at a linear contact between a cover lamella of the package of laminations and the sleeve is more even, which is produced when the package of laminations accommodates a misalignment.

According to yet another embodiment of the present invention, the sleeve of the package of laminations is embodied as a collared sleeve. In the assembled state a collar of the collared sleeve is supported on an end face side of the package of laminations and in the area of the cutouts guarantees an even introduction of a pressure force, which is exerted by a fastening means accommodated in the sleeve on the package of laminations. The collared sleeve can have a collar at both ends. The collared sleeve can be embodied in several parts for this purpose. Alternatively, a second collar can be manufactured by pressing.

According to yet another embodiment of the present invention, the package of laminations may have lamella segments that have an equal number of cutouts. Furthermore, the lamella segments can be embodied with an identical construction. The principle of using the same parts is realized by this, which for its part simplifies and speeds up manufacturing of the claimed package of laminations. Likewise, such a use of the same parts allows a simple automation of the manufacturing of the claimed package of laminations. Moreover, the package of laminations can have a number of sleeves, which corresponds to a whole-number multiple of the number of cutouts in a lamella segment. For example, a package of laminations with six sleeves per layer can have two lamella segments, which each have three cutouts. A rotationally offset stacking of corresponding layers enables a package of laminations to be produced in an especially simple way, which offers a high degree of ability to withstand mechanical stress. The high degree of ability to withstand mechanical stress is brought about inter alia by an essentially even load distribution on the load-bearing sections being produced by the rotationally offset stacking.

Alternatively, or in addition, the package of laminations may have lamella segments that have a different number of cutouts. For example, lamella segments with three cutouts and lamella segments with four cutouts can be combined. There can be such a combination of lamella segments with a differing number of cutouts per layer or across all layers. As a result, a wider diversity of packages of laminations can be produced in a simple manner. For example, in each layer two lamella segments with three cutouts and one lamella segment with four cutouts can be combined to form a package of laminations with ten sleeves. Appropriate lamella segments can be produced with little wastage of material from one blank sheet of metal. Geometrically complex packages of laminations, which have an increased number of sleeves, are thus able to be produced in a cost-effective manner.

According to another aspect of the present invention, a method for manufacturing a package of laminations designed and embodied for use in a multi-plate coupling includes providing, in a first step, a blank sheet of metal ed, from which lamella segments are to be manufactured for the package of laminations. In a further step, a separation pattern that is to be applied to the blank sheet of metal is determined. The separation pattern is embodied as a geometric shape, through which the shape of the lamella segments to be manufactured is defined. The separation pattern in this case can be drawn onto the blank sheet of metal or provided as a processing instruction for a machine tool, with which the blank sheet of metal is to be worked. The separation pattern is applied to the blank sheet of metal, through which the shape for the plurality of lamella segments is determined. In a further step, the plurality of lamella segments is separated from the blank sheet of metal, which can be accomplished, for example, by pressing, using a cutting torch or laser cutting.

In accordance with the present invention, the lamella segments manufactured in this way are embodied as ring segments, which are suitable for combination into a package of laminations. Each of the lamella segments further has at least three cutouts. In an assembled state of a package of laminations, its sleeves are accommodated in the cutouts in the lamella segments. The use of lamella segments with at least three cutouts for sleeves allows a corresponding package of laminations to be manufactured for each layer in a differential mode of construction. The claimed manufacturing method can also be implemented quickly and cost-effectively.

Furthermore, the separation pattern, on the basis of which the plurality of lamella segments is separated from the blank sheet of metal, can have nested contours of lamella segments. The contours of the lamella segments are placed in relation to one another in such a way that these engage in one another and in this way a wastage of material is minimized when they are being separated out. As a result, the high processing speed of the claimed method is linked to a high level of material utilization, which further enhances the economy of the manufacturing method. As a result, the use of especially high-performance and at the same time high-cost materials in the claimed method is cost-effective. In particular the blank sheet of metal can be manufactured from a cold-roiled stainless steel, a composite fiber material, for example glass-reinforced plastic or carbon fiber-reinforced plastic, or a fiber-metal laminate. The use of corresponding high-performance materials in turn increases the ability to withstand mechanical stress, reliability and lifetime of packages of laminations manufactured in this way.

According to yet another aspect of the present invention, a multi-plate coupling has a first flange, which is connected to an input shaft, and a second flange, which is connected to an output shaft. The multi-plate coupling is embodied for transmission of torque from the input shaft to the output shaft and has a package of laminations for this purpose. The package of laminations is connected releasably to the first and second flange and is embodied to transmit a torque present at the first flange to the second flange. The package of laminations is embodied here in accordance with at least one of the forms of embodiment outlined above. As an alternative or in addition the package of laminations employed in the inventive multi-plate coupling is manufactured according to a form of embodiment of the method of manufacturing presented above. Such a multi-plate coupling offers a high degree of ability to withstand mechanical stress and is embodied in a compact manner. Such a multi-plate coupling further has an enhanced reliability and service life and can be manufactured in a simple way.

According to still another aspect of the present invention, an industrial application has a drive unit that has an output shaft, via which torque is to be transmitted to a driven unit. The output shaft is connected via a multi-plate coupling to an input shaft for torque transmission, which in its turn is connected to a driven unit. The drive unit can be embodied as an electric motor, a combustion engine or a hydraulic motor for example. The driven unit can be embodied as a mechanical application, so that the industrial application is embodied for example as a mill, a rolling mill, a cement mill, a sugar mill, an extruder, a conveyor system, a rock crusher, a roller crusher, a roller press, a pump, a ventilator, a compressor, a ship's drive, a lifting device, a mill press or a scrap press.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
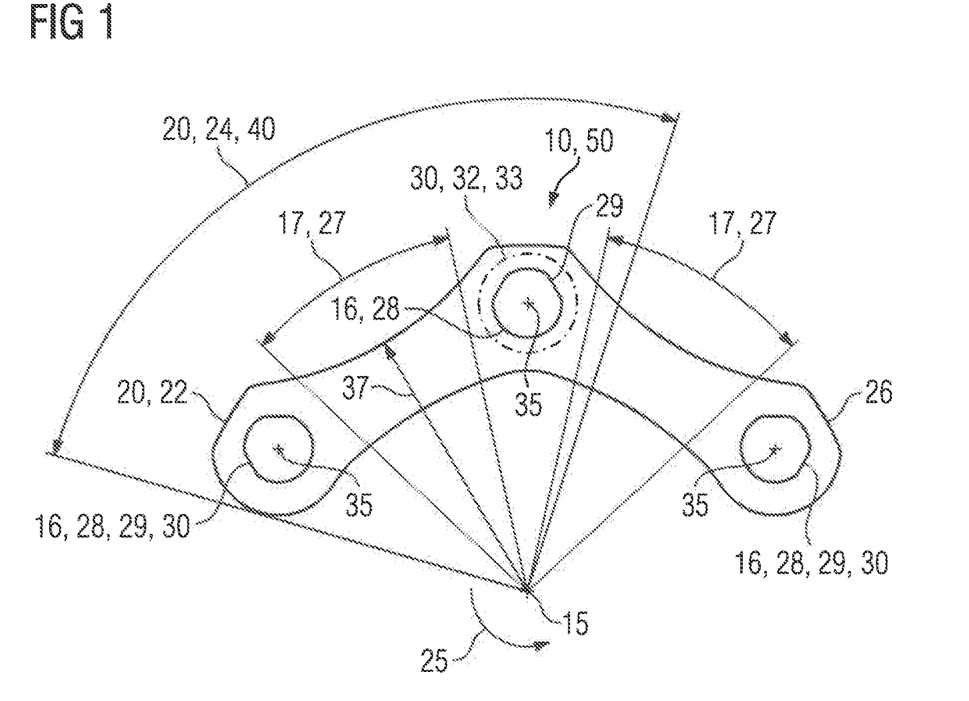
FIG. 1 shows in a schematic view a lamella segment of a first embodiment of a package of laminations according to the present invention.

Turning now to the drawing, and in particular to FIG. 1, there is shown a schematic view of a lamella segment 20, which can be employed in a package of laminations 10, which in its turn can be used in a coupling 50. The lamella segment 20 serves as a first lamella segment 22 in the package of laminations 10 for example and is essentially embodied in a curved shape. Viewed about a main axis of rotation 15 of the coupling 50, the lamella segment 20 has a plurality of cutouts 28, of which the center points are arranged essentially on an outer radius 37 of the lamella segment 20. The cutouts 28 are embodied, in an assembled state of the package of laminations 10, to each accommodate a sleeve 30. The cutouts 28, at least in sections, have a non-circular shape 29, through which fastening means 16 not shown in any greater detail are prevented by a form fit from rotating during operation of the coupling 50. The location of the respective screw axis 35 of the fastening means 16 on the outer radius 37 of the lamella segment 20 is further defined by the central points of the cutouts 28. The lamella segment 20 is thus embodied as a ring segment 26 and can be combined with further lamella segments 20 of an identical design or similar lamella segments into a package of laminations 10.

The lamella segment 20, which serves as the first lamella segment 22, is further connected via the sleeves 30 to a second lamella segment 24 not shown in any greater detail lying on top of it. The second lamella segment 24 overlaps with the first lamella segment 22 at two adjacent cutouts 28, so that an overlapping area 40 is embodied. The first and second lamella segment 22, 24 thus overlap in part. Sections of the lamella segment 20 that lie between two cutouts 28, form curved sections 17 that serve as load-bearing sections 27. The load-bearing sections 27 are subjected to a tensile stress by a torque 25, which is exerted about the main axis of rotation 15 when the coupling 10 is operating. The lamella segment 20 is essentially embodied as a flat component and can be manufactured from a sheet of metal for example. As a result, the lamella segment 20 can be manufactured cost-effectively and can be combined with a plurality of identically designed or similar lamella segments 20 into a package of laminations 10.

Figure 2:
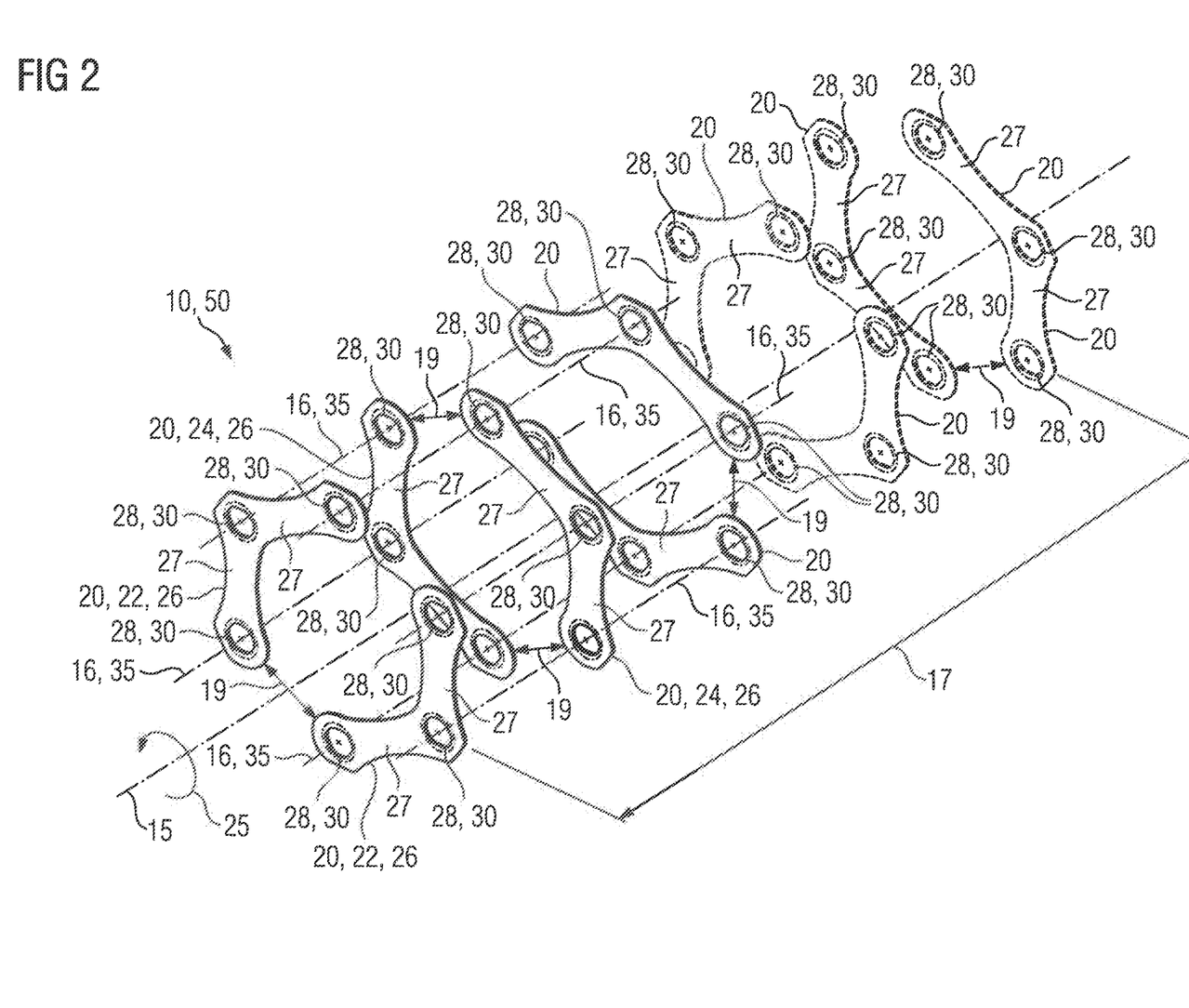
FIG. 2 shows an assembly drawing of the first embodiment of the package of laminations according to the present invention.

FIG. 2 shows a schematic of the construction of a package of laminations 10 from a plurality of lamella segments 20 from FIG. 1. The package of laminations 10 is embodied to be used in a coupling 50 not shown in any greater detail. The individual lamella segments 20 are aligned about a main axis of rotation 16 of the package of laminations 10, about which a torque 25 will be exerted when a coupling 50 is operating. The package of laminations 20 comprises two first lamella segments 22, which are embodied identically. Each of the first lamella segments 22 has three cutouts 28, between which a load-bearing section 27 is embodied in each case. The load-bearing sections 27 are subjected to a tensile stress through the torque 25 that is exerted on the package of laminations 10. The cutouts 28 for their part are embodied to accommodate a sleeve 30. The first lamella segments 22 form a common layer or tier of the package of laminations 10.

The package of laminations 10 also comprises further lamella segments 20, which are arranged in layers. The package of laminations 10 has two second lamella segments 24, which together form a layer or tier of the package of laminations 10, which lies on the layer or tier formed by the first lamella segments 22. The second lamella segments 24 are identical in design to the first lamella segments 22 and likewise have three cutouts 28 with load-bearing sections 27 lying between them. The cutouts 28 in the second lamella segments 24 are also embodied to accommodate a sleeve 30. The cutouts 28 of the first and second lamella segments 22, 24 are aligned flush with one another, so that accordingly a common sleeve 30 can be accommodated in them. The cutouts 28 are aligned along a screw axis 25, along which in the corresponding sleeve 30 a fastening means 16 can be accommodated releasably. Each of the first lamella segments 22 is connected partly overlapping with a second lamella segment 24. An empty space 19, which is present in the circumferential direction between the second packages of laminations 24, is bridged in this way by one of the first lamella segments 22. Correspondingly an empty space 19 between the two first packages of laminations 22 is bridged by a second package of laminations 24. The location of the empty space 19 between the lamella segments 20 is offset from a layer or tier of the package of laminations 10, locked in stages by the location of cutouts 28, by a minute rotation of the lamella segments 20.

This structure continues in the package of laminations 10 according to FIG. 1 over a plurality of layers or tiers with lamella segments 20. The lamella segments 20, i.e. also the first and second lamella segments 22, 24, are essentially embodied as ring segments 26 and, spaced apart by the empty spaces 19, form an interrupted ring shape in each layer or tier. The structure of the package of laminations 10 in FIG. 2 has five layers or tiers. Viewed along a segment of the curve 17, four load-bearing sections 27 are arranged in five layers or tiers. This represents an approximation of a package of laminations that is manufactured exclusively from continuous ring-shaped lamellae.

With five layers or tiers, each with six cutouts 28 and twenty load-bearing sections 27 present, for the package of laminations 10 shown in FIG. 2, a degree of lamella filling of 20/30, i.e. 66.7%, is produced. The lamella segments 20 can be manufactured, with reduced waste of material, from a blank sheet of metal, which allows fast and cost-effective production. In particular, through the degree of lamella filling of at least 60% and the low-cost manufacturing an especially favorable ratio of ability to withstand mechanical stress and costs for the claimed package of laminations 10 is achieved.

Figure 3:
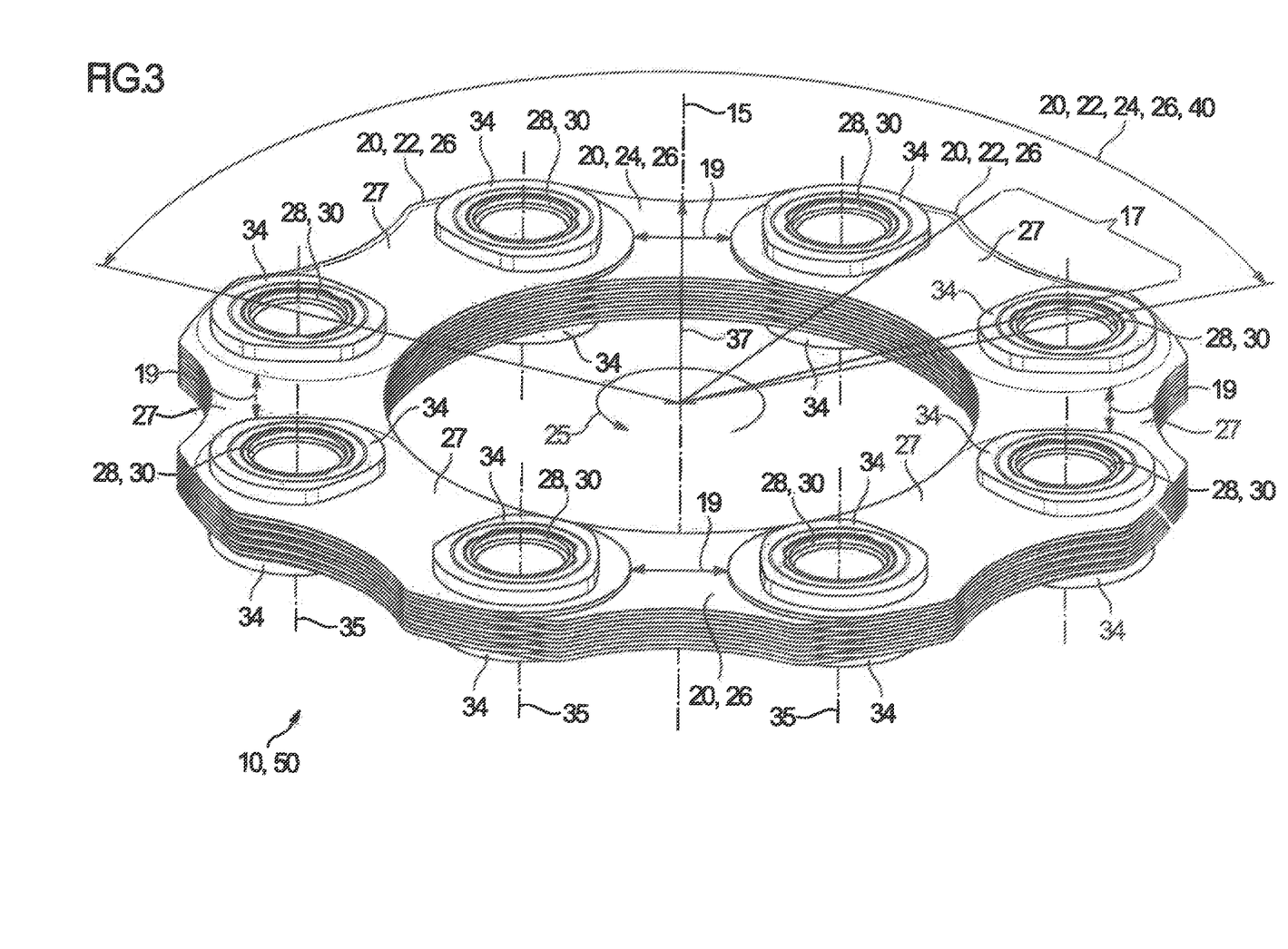
FIG. 3 shows a schematic view of a lamella segment of a second embodiment of the package of laminations according to the present invention.

FIG. 3 shows a schematic view of a claimed package of laminations 10 in accordance with a second form of embodiment. The package of laminations 10 is embodied for use in a coupling 50 not shown in any greater detail and has a plurality of lamella segments 20, which essentially serve, as in FIG. 2, as first and second lamella segments 22, 24. By contrast with the form of embodiment according to FIG. 2, in FIG. 3 the lamella segments 20 have four cutouts 28 for accommodating sleeves 30. The first lamella segments 22 are embodied as ring segments 26 and, taking account of empty spaces 19 lying between them, essentially form a ring shape, which is aligned about a main axis of rotation 15 of the package of laminations 10. A torque 25 is exerted about the main axis of rotation 15 when the package of laminations 10 is operating. The lamella segments 20 in the structure according to FIG. 3 are also embodied as an identical design, i.e. interchangeable with one another.

A load-bearing section 27 is embodied between two cutouts 28 in each case, which is essentially embodied as a curved section 17. Cutouts 28 adjoin the load-bearing sections 27, which are embodied to accommodate sleeves 30. The sleeves 30 are provided with rings 34 at their ends, through which the package of laminations 10 is held together. The sleeves 30 and the rings 34 can be connected to one another by cold working or by a clip fit for example.

The first lamella segments 22, which together form a layer or tier of the package of laminations 10, lie on the second lamella segments 24, wherein the second packages of laminations 24 bridge the empty spaces 19 between the first packages of laminations 22. Corresponding to this the first lamella segments 22 bridge the empty spaces 19 not shown between the second lamella segments 24. Through this a connection is formed between the first and second lamella segments 22, 24, which provides a high degree of ability to withstand mechanical stress. In this way an essentially curved-shape overlapping area 40 is embodied between the first and second lamella segments 22, 24. The structure shown for the first and second lamella segments 22, 24 is also embodied in a similar way in further layers or tiers of lamella segments 20, wherein lamella segments bridge over empty spaces 19 between other lamella segments 20. For the structure in accordance with FIG. 1 a degree of lamella filling of 75% is produced. The greater the number of cutouts 28 per lamella segment 20 is, the greater is the degree of lamella filling able to be obtained. The greater the degree of lamella filling is, the more similar the package of laminations 10 is to a package of laminations that is only embodied from ring-shaped lamellae. The fact that the lamella segments 20 in accordance with FIG. 3 can be manufactured quickly and cost-effectively from a blank sheet of metal for example means that an especially favorable ratio of ability to withstand mechanical stress to manufacturing effort or manufacturing costs is produced.

Figure 4:
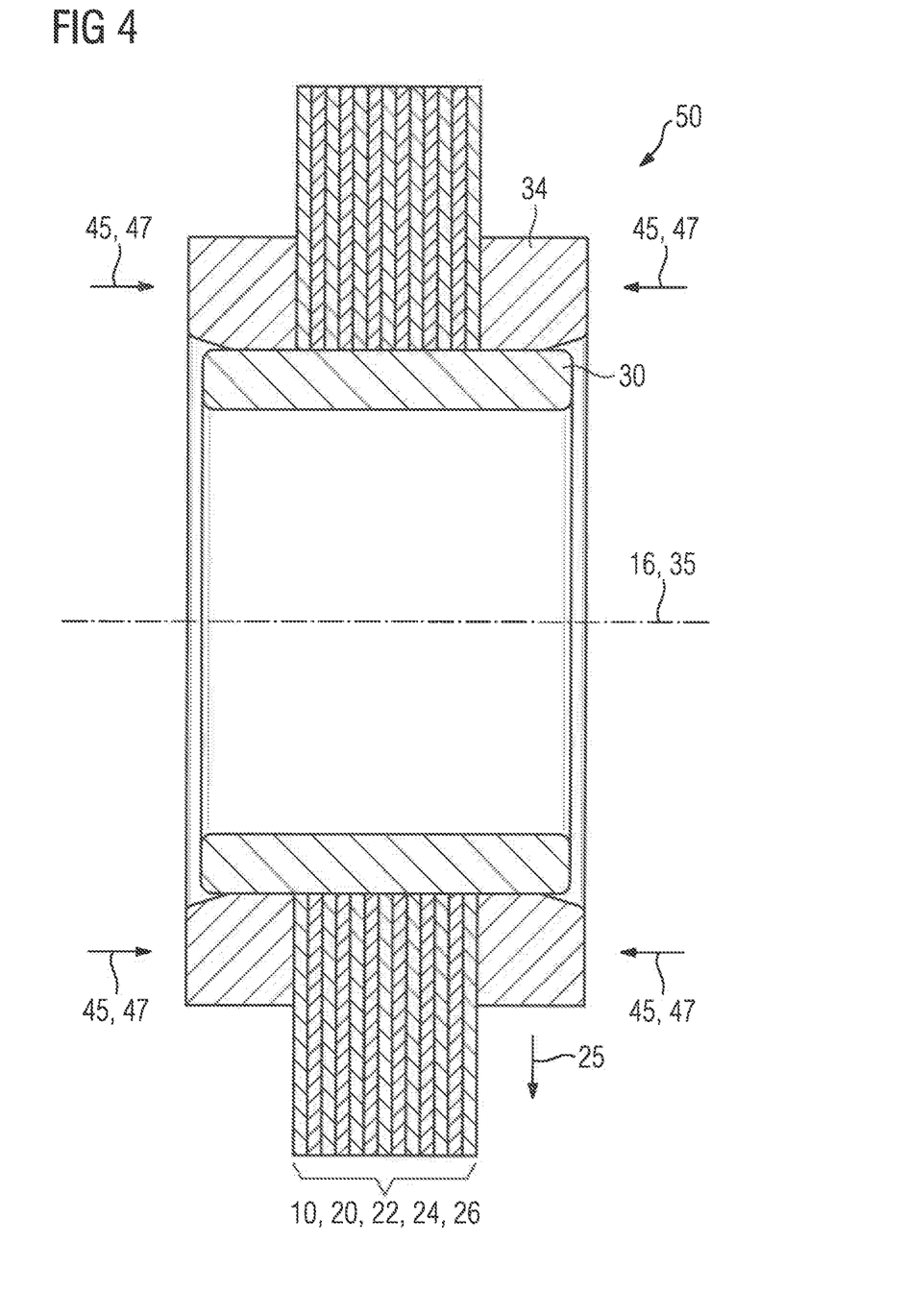
FIG. 4 shows the package of laminations of the second embodiment in a longitudinal section.

Shown schematically in FIG. 4 is a package of laminations 10 in a longitudinal section as in FIG. 3 for example, which can be used in a coupling 50. The package of laminations 10 comprises a plurality of lamella segments 20, which are essentially arranged in layers. First and second lamella segments 24 belong to the lamella segments 20, which each form ring segments 26 that supplement each other. In the assembled state as in FIG. 4 the first and second lamella segments 22, 24 overlap so that empty spaces of lamella segments 20 in adjacent layers or tiers of the package of laminations 10 are bridged over. To this end the lamella segments 20 are arranged in such a way that their cutouts 28 are positioned flush with one another. The cutouts 28 are aligned flush in this case with a screw axis 35 in a sleeve 30, which is accommodated in the cutouts 28. The sleeves 30 are provided with rings 34 at their ends, which are pressed onto the sleeve 30, i.e. are connected to them by cold working. As an alternative a click fit can be embodied between the sleeve 30 and the ring 34.

Fastening means 16, such as screws for example, can be accommodated releasably along the screw axes 35 in the sleeves 30. When the coupling 50 is operating a torque 25 is introduced into the package of laminations 10, through which the lamella segments 20 are essentially subjected to a tensile stress. This is introduced through the sleeve 30 into the package of laminations 10, wherein the sleeve 30 is pressed by a pressure force 45 onto the package of laminations 10. Through this the package of laminations 10 is held under a pre-tension 47. In addition, the force is transmitted in a form fit with the fastening means and the sleeve.

Figure 5:
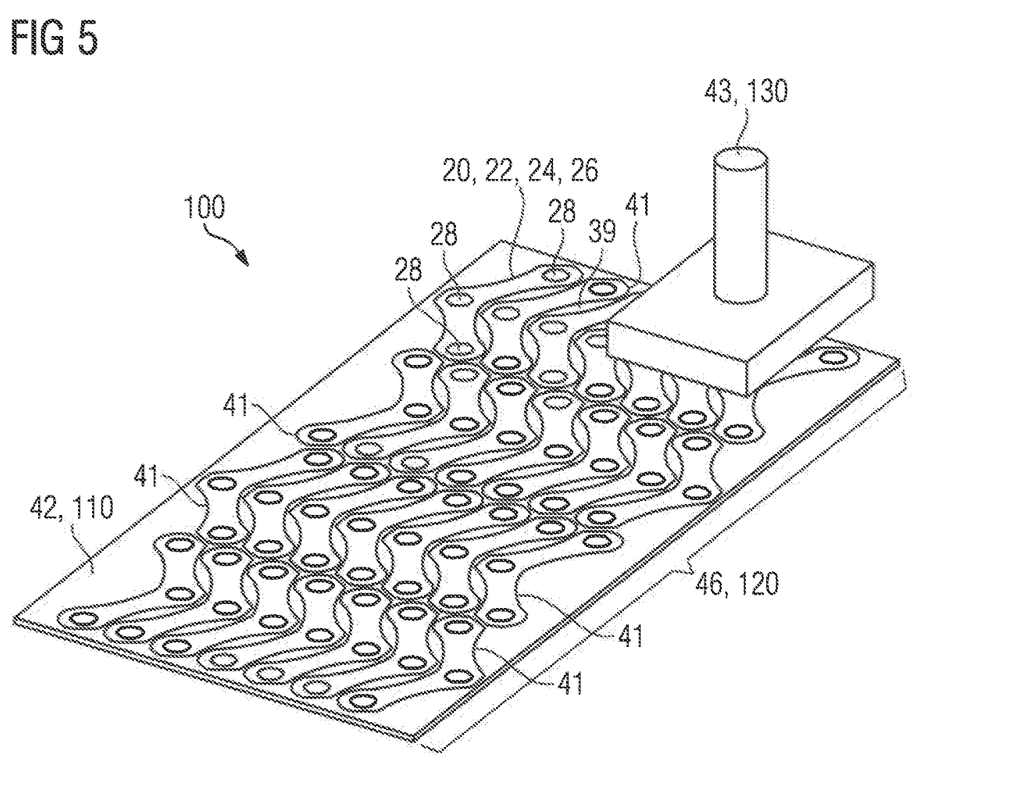
FIG. 5 shows a schematic oblique view of an embodiment of the manufacturing method according to the present invention.

A first form of embodiment of the claimed manufacturing method 100 is depicted in a schematic oblique view in FIG. 5. The method 100 is based on a first step 110, in which a blank sheet of metal 42 is provided. The method 100 in FIG. 5 is likewise based on a second step 120, in which a plurality of contours 41 on lamella segments 20 is put together into a separation pattern 46 for the blank sheet of metal 42. The separation pattern 46 thus forms a plurality of lamella segments 20, which are suitable as first and second lamella segments 22, 24 for a package of laminations 10, as in FIG. 1 to FIG. 4 for example. To this end the lamella segments 20 essentially form ring segments 26 that supplement one another. The contours 41 of a number of lamella segments 20 are nested in one another in the separation pattern 46, i.e. positioned in such a way that any waste of material 39 between them is minimized. The cutouts 28 also belong to the contours 41 in this case. The separation pattern 46 can be set by a user or created by a corresponding geometry algorithm. In a further step 130 lamella segments 20 are separated out from the blank sheet of metal 42 by a stamp tool 43. As a result of this the material of a blank sheet of metal 42 can be utilized in a low-loss manner, which allows especially cost-effective manufacturing. This in turn makes it possible, in the manufacturing of lamella segments 20, to make economical use of more high-performance and higher-cost materials, through which in turn the quality of the lamella segments 20, and thus of the desired package of laminations 10, is enhanced.

Figure 6:
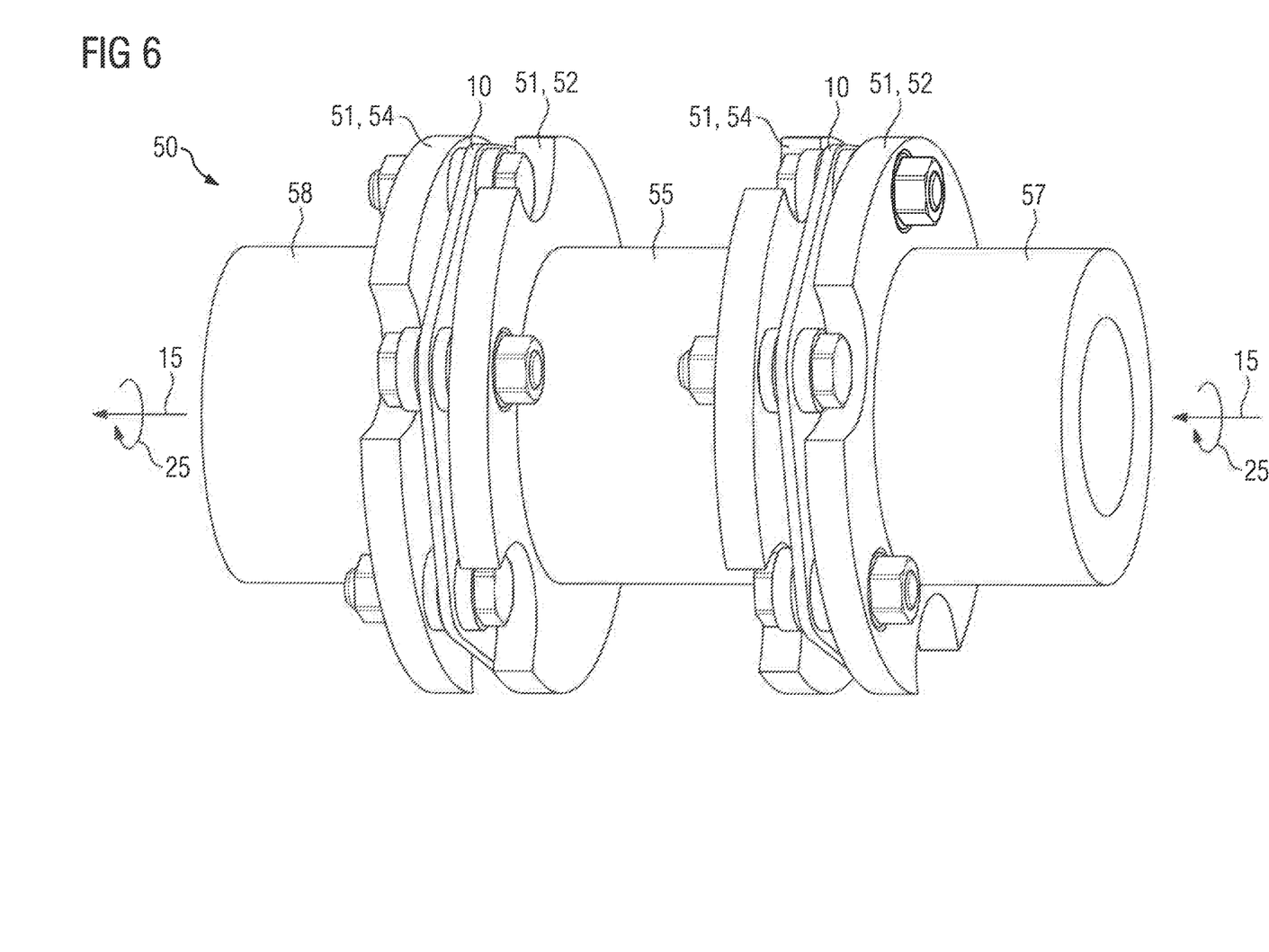
FIG. 6 shows a schematic layout of an embodiment of a multi-plate coupling according to the present invention.

FIG. 6 shows a schematic of the structure of a claimed coupling 50, in which packages of laminations 10, as shown for example in FIG. 1 to 4, are employed. The coupling 50 comprises a first and a second hub 57, 58, via which torque 25 can be supplied or taken off about a main axis of rotation 15. The coupling 50 also comprises an intermediate piece 55, which is provided with two flanges 51. The first and second hub 57, 58 are also each provided with a flange 51. A flange 51 of a hub 57, 58 with a respective flange 51 of the intermediate piece 55 forms a pair of flanges each with a first flange 52 and a second flange 54. A first flange 52 is connected to a second flange 54 releasably via fastening means 16 via a package of laminations 10 in each case. The packages of laminations 10 each have a plurality of lamella segments 20, which are essentially embodied as ring segments 26. The coupling 50 in accordance with FIG. 6 is embodied overall as a multi-plate coupling.

Figure 7:
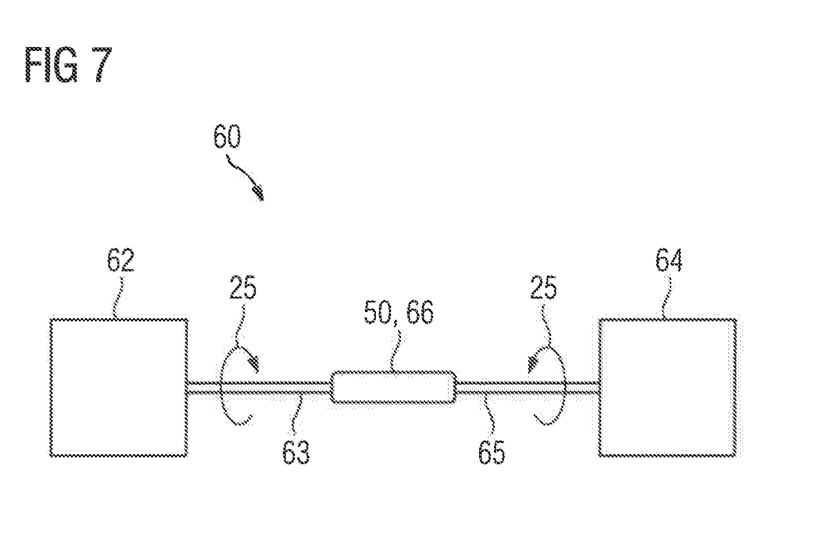
FIG. 7 shows a schematic diagram of an embodiment of an industrial application according to the present invention.

Shown in FIG. 7 is a schematic of the structure of an industrial application 60 according to a claimed form of embodiment of the invention. The industrial application 60 has a drive unit 62 and a driven unit 64. The drive unit 62 is provided with a drive shaft 63, via which a torque 25 created by the drive unit 62 is transmitted to a coupling 66. The coupling 66 in its turn is connected via a power take-off shaft 65 for torque transmission to the driven unit 64. The torque 25 from the drive unit 62 is transmitted in this way by the coupling 66 to the driven unit 64. The drive unit 62 can be embodied as an electric motor, a combustion engine or a hydraulic motor for example. The driven unit can be embodied as a mechanical application, so that the industrial application is embodied as a mill, a rolling mill, a cement mill, a sugar mill, an extruder, a conveyor system, a rock crusher, a roller crusher, a roller press, a pump, a ventilator, a compressor, a ship's drive, a lifting device, a mill press or a scrap press for example. The coupling 66 in this case is embodied as a coupling 50 in accordance with one of FIG. 1 to FIG. 4.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A package of laminations, comprising a plurality of lamella segments, each of the lamella segments having a plurality of cutouts and at least one of the lamella segments having at least three cutouts, wherein the lamella segments are arranged in layers oriented perpendicular to a main axis of rotation and connected together in each layer to form ring segments with a closed circumferential outer contour, with a first lamella segment in a first layer projecting beyond a second lamella segment in a subsequent adjoining second layer so as to overlap a space between two second lamella segments along a circumferential direction.

2. The package of laminations of claim 1, wherein the first lamella segment is connected to the second lamella segment with a partial overlap via a sleeve at at least two cutouts.

3. The package of laminations of claim 2, comprising six or eight sleeves.

4. The package of laminations of claim 2, wherein the package of laminations has a degree of lamella filling of at least 60% in a curved section between two sleeves, whereas the degree of lamella filling is defined as a quotient of a number of load-bearing sections present in the package of laminations divided by the number of load-bearings sections when the lamella segments were to be replaced by one-piece ring lamella.

5. The package of laminations of claim 2, comprising a plurality of sleeves, with at least one sleeve having a cross section different from a circular shape.

6. The package of laminations of claim 1, wherein all lamella segments have an identical number of cutouts.

7. A method for manufacturing a package of laminations having a plurality of lamella segments embodied as ring segments, with each ring segment having at least three cutouts for accommodating a sleeve, said method comprising:
   determining a separation pattern for the plurality of lamella segments;
   separating the plurality of lamella segments from a blank sheet of metal commensurate with the separation pattern; and
   arranging the separated lamella segments in layers oriented perpendicular to a main axis of rotation and connecting the separated lamella together in each layer to form ring segments with a closed circumferential outer contour, with a first lamella segment in a first layer projecting beyond a second lamella segment in a subsequent adjoining second layer so as to overlap a space between two second lamella segments along a circumferential direction.

8. The method of claim 7, wherein the separation pattern defines a plurality of contours of nested lamella segments.

9. The method of claim 7, wherein the blank sheet of metal is constructed from a cold-rolled stainless steel.

10. A multi-plate coupling, comprising:
   a first flange;

a second flange; and a package of laminations releasably connecting the first flange to the second flange for transmission of a torque, said package of laminations comprising a plurality of lamella segments, with each of the lamella segments having a plurality of cutouts and at least one of the lamella segments having at least three cutouts, wherein the lamella segments are arranged in layers oriented perpendicular to a main axis of rotation and connected together in each layer to form ring segments with a closed circumferential outer contour, with a first lamella segment in a first layer projecting beyond a second lamella segment in a subsequent adjoining second layer so as to overlap a space between two second lamella segments along a circumferential direction.

11. An industrial application, comprising:

a drive unit having an output shaft;

a driven unit having an input shaft; and a coupling connecting the output shaft to the input shaft for torque transmission, wherein the coupling is constructed as a multi-plate coupling and comprises a first flange, a second flange, and a package of laminations releasably connecting the first flange to the second flange for transmission of a torque, said package of laminations comprising a plurality of lamella segments, with each of the lamella segments having a plurality of cutouts and at least one of the lamella segments having at least three cutouts, wherein the lamella segments are arranged in layers oriented perpendicular to a main axis of rotation and connected together in each layer to form ring segments with a closed circumferential outer contour, with a first lamella segment in a first layer projecting beyond a second lamella segment in a subsequent adjoining second layer so as to overlap a space between two second lamella segments along a circumferential direction.

\* \* \* \* \*